(12) United States Patent
Chu (10) Patent No.: US 8,320,554 B1
(45) Date of Patent: Nov. 27, 2012

(54) ACOUSTIC ECHO CANCELLER CLOCK COMPENSATION

(75) Inventor: Peter L. Chu, Lexington, MA (US)

(73) Assignee: Polycom, Inc., San Jose, CA (US)

( * ) Notice: Subject to any disclaimer, the term of this patent is extended or adjusted under 35 U.S.C. 154(b) by 183 days.

(21) Appl. No.: 12/907,224

(22) Filed: Oct. 19, 2010

(51) Int. Cl.
*H04M 9/08* (2006.01)

(52) U.S. Cl. .............................. 379/406.08; 379/406.09

(58) Field of Classification Search ............. 379/406.01, 379/406.08, 406.09
See application file for complete search history.

(56) References Cited

U.S. PATENT DOCUMENTS

| | | | |
|---|---|---|---|
| 5,263,019 A | 11/1993 | Chu | |
| 5,305,307 A | 4/1994 | Chu | |
| 5,390,244 A | 2/1995 | Hinman et al. | |
| 6,959,260 B2 | 10/2005 | Rodman et al. | |
| 6,990,084 B2 * | 1/2006 | Hayward | 370/287 |
| 7,120,259 B1 | 10/2006 | Ballantyne et al. | |
| 7,526,078 B2 | 4/2009 | Rodman et al. | |
| 7,680,285 B2 | 3/2010 | Ballantyne et al. | |
| 7,742,588 B2 | 6/2010 | Rodman et al. | |
| 7,787,605 B2 | 8/2010 | Rodman | |
| 7,864,938 B2 | 1/2011 | Rodman et al. | |
| 7,978,838 B2 | 7/2011 | Rodman et al. | |
| 2003/0063577 A1 * | 4/2003 | Hayward | 370/286 |
| 2007/0273751 A1 | 11/2007 | Sachau | |
| 2008/0024593 A1 | 1/2008 | Tsirinsky et al. | |
| 2010/0081487 A1 | 4/2010 | Chen et al. | |
| 2011/0069830 A1 * | 3/2011 | Chu et al. | 379/406.16 |

OTHER PUBLICATIONS

Copending U.S. Appl. No. 13/282,633, entitled "Compensating for Different Audio Clocks Between Devices Using Ultrasonic Beacon," by Peter L. Chu et al., filed Oct. 27, 2011.

* cited by examiner

*Primary Examiner* — Creighton Smith
(74) *Attorney, Agent, or Firm* — Wong, Cabello, Lutsch, Rutherford & Brucculeri, L.L.P.

(57) ABSTRACT

A conferencing endpoint uses acoustic echo cancellation with clock compensation. Receiving far-end audio to be output by a local loudspeaker, the endpoint performs acoustic echo cancellation so that the near-end audio capture by a microphone will lack echo of the far-end audio output from the loudspeaker. The converters for the local microphone and loudspeaker may have different clocks so that their sample rates differ. To assist the echo cancellation, the endpoint uses a clock compensator that cross-correlates an echo estimate of the far-end audio and the near-end audio and adjusts a sample rate conversion factor to be used for the far-end audio analyzed for echo cancellation.

39 Claims, 3 Drawing Sheets

ACOUSTIC ECHO CANCELLER CLOCK COMPENSATION

BACKGROUND

Acoustic echo is a common problem in full duplex audio systems, such as audio conferencing or videoconferencing systems. Acoustic echo occurs when the far-end speech sent over a network comes out from the near-end loudspeaker, feeds back into a nearby microphone, and then travels back to the originating site. Talkers at the far-end location can hear their own voices coming back slightly after they have just spoken, which is undesirable.

To reduce this type of echo, audio systems can use an acoustic echo cancellation technique to remove the audio from the loudspeaker that has coupled back to the microphone and the far-end. Acoustic echo cancellers employ adaptive filtering techniques to model the impulse response of the conference room in order to reproduce the echoes from the loudspeaker signal. The estimated echoes are then subtracted from the out-going microphone signals to prevent these echoes from going back to the far-end.

In some situations, the microphone and loudspeakers use converters with different clocks. For example, the microphone captures an analog waveform, and an analog-to-digital (A/D) converter converts the analog waveform into a digital signal. Likewise, the loudspeaker receives a digital signal, and a digital-to-analog (D/A) converter converts the digital signal to an analog waveform.

The conversions performed by the converters use a constant sampling rate provided by a crystal that generates a stable and fixed frequency clock signal. When the converters are driven by a single clock, the converters can produce the same number of samples as one another. However, the converters may be driven by separate clocks with different levels of performance, frequency, stability, accuracy, etc. Thus, the two convertors may perform their conversions at slightly different rates. Accordingly, the number of samples produced over time by the A/D convertor will not match the number of samples consumed in the same period of time by the D/A convertor. This differences becomes more pronounced over time.

For good acoustic echo cancellation, the loudspeaker's clock and the microphone's clock are preferably at the same frequency to within a few parts per million (PPM). In a desktop computer or wireless application, the loudspeaker and microphone clocks are typically controlled by physically separate crystals so that their frequencies may be off by 100 PPM or more. Dealing with the discrepancy presents a number of difficulties when performing acoustic echo cancellation. Moreover, attempting to measure this frequency difference by using the audio present on the loudspeaker and microphone channels can be difficult as well.

One prior art technique disclosed in U.S. Pat. No. 7,120,259 to Ballantyne et al. performs adaptive estimation and compensation of clock drift in acoustic echo cancellers. This prior art technique examines buffer lengths of the loudspeaker and microphone paths and tries to maintain equivalent buffer lengths to within one sample. However, accuracies greater than a sample may be necessary for good acoustic echo cancellation.

The subject matter of the present disclosure is directed to overcoming, or at least reducing the effects of, one or more of the problems set forth above.

SUMMARY

A conferencing endpoint, such as a computer for desktop videoconferencing or the like, uses an acoustic echo canceller with a clock compensator for the different clocks used to capture and output conference audio. The endpoint receives far-end audio for output to a local loudspeaker having a clock. This far-end audio can come from a far-end endpoint over a network and interface. The loudspeaker's clock runs a digital-to-analog converter for outputting the far-end audio to the near-end conference environment. In one arrangement, the clock and D/A converter can be part of a sound card on the endpoint.

Concurrently, the endpoint receives near-end audio captured with a local microphone having its own clock. This near-end audio can include audio from participants, background noise, and acoustic echo from the local loudspeaker. The microphone's clock runs an analog-to-digital converter, and the microphone can be independent separate piece of hardware independent of the endpoint.

To deal with acoustic echo, the endpoint uses its acoustic echo canceller to perform acoustic echo cancellation of the near-end audio. After echo cancellation, the endpoint can output audio for transmission to the far-end that has the acoustically coupled far-end audio removed. This acoustic echo canceller can use adaptive filtering of sub-bands of audio to match the far-end and near-end audio and to estimate the echo so it can be subtracted from the near-end signal for transmission.

Because the clocks of the microphone and loudspeaker can have different conversion sample rates, the acoustic echo cancellation may not perform as fully as desired. To handle the clock discrepancy, the acoustic echo canceller uses a clock compensator in its processing. The clock compensator cross-correlates the acoustic echo estimate of the far-end signal with the near-end signal. For example, the acoustic echo estimate can result from the adaptive filtering by the acoustic echo canceller before subtraction from the near-end signal. Based on the cross-correlation, the clock compensator adjusts the far-end audio used for the acoustic echo cancellation.

This adjustment uses a factor that relates the two conversion rates of the two clocks based on the cross-correlation. In general, the conversion rates of the two clocks can be off by more than 100 PPM. Operating in a phase locked loop, however, the canceller and compensator can match the loudspeaker and microphone clocks to within 1 PPM or less within a short interval of speech. For example, they may match the clocks to within about +/−0.02 PPM after 30 seconds of speech in one implementation.

In the clock compensator, noise thresholding and whitening are performed during the cross-correlation process. In addition, the clock compensator may not adjust the sample conversion rate factor during double-talk and may ignore the cross-correlation results if below a certain threshold.

The foregoing summary is not intended to summarize each potential embodiment or every aspect of the present disclosure.

DETAILED DESCRIPTION

Figure 1:
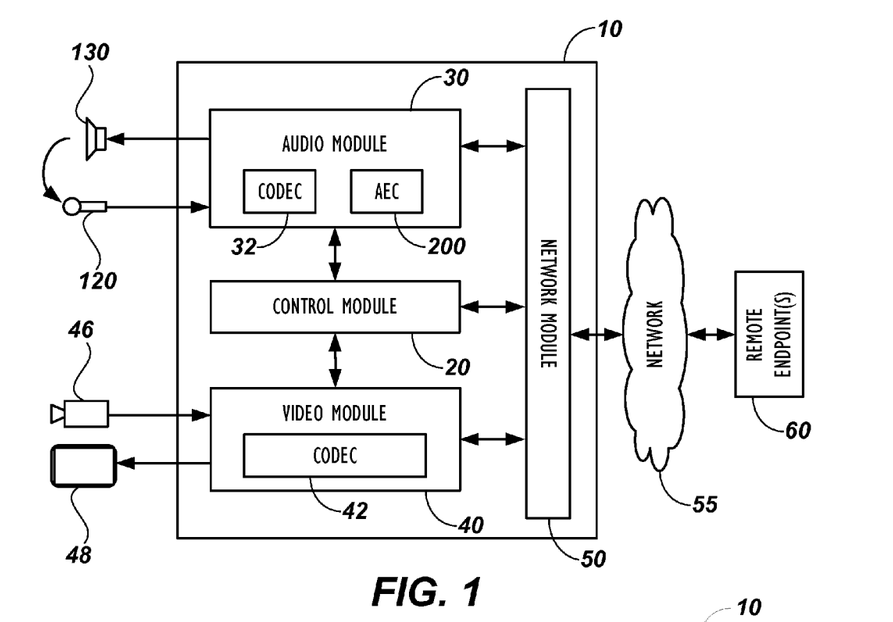
FIG. 1 illustrates a conferencing endpoint according to certain teachings of the present disclosure.

A conferencing apparatus or endpoint 10 in FIG. 1 communicates with one or more remote endpoints 60 over a network 55. Among some common components, the endpoint 10 has an audio module 30 with an audio codec 32 and has a video module 40 with a video codec 42. These modules 30/40 operatively couple to a control module 20 and a network module 50.

A microphone 120 captures audio and provides the audio to the audio module 30 and codec 32 for processing. The microphone 120 can be a table or ceiling microphone, a part of a microphone pod, an integral microphone to the endpoint, or the like. The endpoint 10 uses the audio captured with the microphone 120 primarily for the conference audio. In general, the endpoint 10 can be a conferencing device, a videoconferencing device, a personal computer with audio or video conferencing abilities, or any similar type of communication device. If the endpoint 10 is used for videoconferencing, a camera 46 captures video and provides the captured video to the video module 40 and codec 42 for processing.

After capturing audio and video, the endpoint 10 encodes it using any of the common encoding standards, such as MPEG-1, MPEG-2, MPEG-4, H.261, H.263 and H.264. Then, the network module 50 outputs the encoded audio and video to the remote endpoints 60 via the network 55 using any appropriate protocol. Similarly, the network module 50 receives conference audio and video via the network 55 from the remote endpoints 60 and sends these to their respective codec 32/42 for processing. Eventually, a loudspeaker 130 outputs conference audio, and a display 48 can output conference video. Many of these modules and other components can operate in a conventional manner well known in the art so that further details are not provided here.

The endpoint 10 further includes an acoustic echo cancellation module 200 that reduces the acoustic echo. As is known, acoustic echo results from far-end audio output by the loudspeaker 130 being subsequently picked up by the local microphone 120, reprocessed, and sent back to the far-end. The acoustic echo cancellation module 200 can be based on acoustic echo cancellation techniques known and used in the art to reduce or eliminate this form of echo. For example, details of acoustic echo cancellation can be found in U.S. Pat. Nos. 5,263,019 and 5,305,307, which are incorporated herein by reference in their entireties, although any other number of available sources have details of acoustic echo cancellation.

Figure 2:
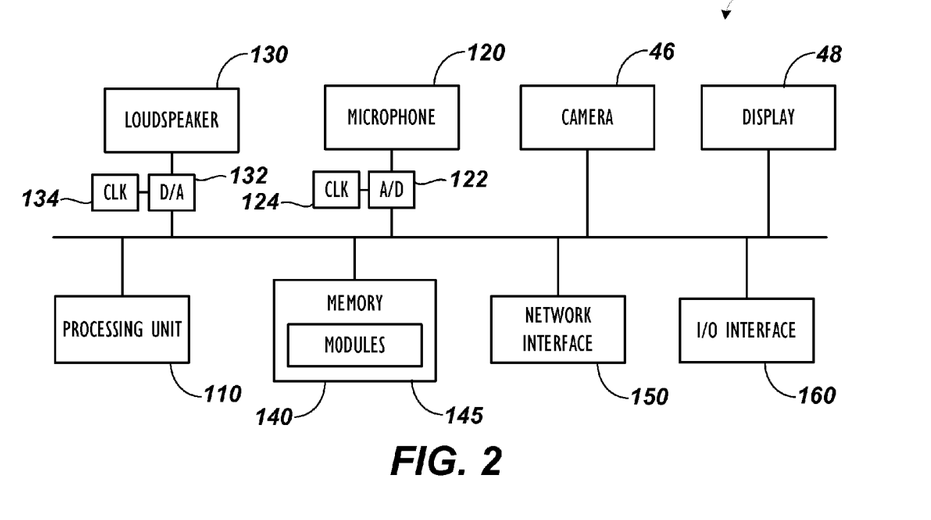
FIG. 2 illustrates components of the conferencing endpoint of FIG. 1 in additional detail.

Shown in more detail in FIG. 2, the endpoint 10 has a processing unit 110, memory 140, a network interface 150, and a general input/output (I/O) interface 160 coupled via a bus 100. As before, the endpoint 10 has the microphone 120 and loudspeaker 130 and can have the video components of a camera 46 and a display 48 if desired.

The memory 140 can be any conventional memory such as SDRAM and can store modules 145 in the form of software and firmware for controlling the endpoint 10. The stored modules 145 include the various video and audio codecs 32/42 and other modules 20/30/40/50/200 discussed previously. Moreover, the modules 145 can include operating systems, a graphical user interface (GUI) that enables users to control the endpoint 10, and other algorithms for processing audio/video signals.

The network interface 150 provides communications between the endpoint 10 and remote endpoints (not shown). By contrast, the general I/O interface 160 provides data transmission with local devices such as a keyboard, mouse, printer, overhead projector, display, external loudspeakers, additional cameras, microphones, etc.

During operation, the loudspeaker 130 outputs audio in the conference environment. For example, this output audio can include far-end audio received from remote endpoints via the network interface 150 and processed with the processing unit 110 using the appropriate modules 145. At the same time, the microphone 120 captures audio in the conference environment and produce audio signals transmitted via the bus 100 to the processing unit 110.

For the captured audio, the processing unit 110 processes the audio using algorithms in the modules 145. In general, the endpoint 10 processes the near-end audio captured by the microphone 120 and the far-end audio received from the transmission interface 150 to reduce noise and cancel out acoustic echo that may occur between the captured audio. Ultimately, the processed audio can be sent to local and remote devices coupled to interfaces 150/160.

In particular, the endpoint 10 uses the acoustic echo canceller 200 of FIG. 1 that can operate on the signal processor 110. The acoustic echo canceller 200 removes the echo signal from the captured near-end signal that may be present due to the loudspeaker 130 in the conference environment. As noted previously, any suitable algorithm for estimating and reducing the acoustic echo can be used.

As shown in FIG. 2, the microphone 120 uses an analog-to-digital (A/D) converter 122 that runs off a clock 124. The loudspeaker 130 by contrast uses a digital-to-analog (D/A) converter 132 that also runs off another clock 134. In some situations, the microphone and loudspeaker clocks 124/134 may not be locked or synced to each other. In a desktop computing environment, for example, the loudspeaker 130 may use a clock 134 from a sound card or other interface on the endpoint 10. For its part, the microphone 120 can be a separate microphone connected by USB. Alternatively, the microphone 120 may be incorporated into a web cam. Either way, the microphone 120 may have a separate clock 124 from the loudspeaker's clock 134.

For good acoustic echo cancellation by the acoustic echo cancellation module 200, the loudspeaker's clock 134 and the microphone's clock 124 are preferably at the same frequency (i.e., to within a few parts per million (PPM), for example). In some implementations, the loudspeaker and microphone clocks 124/134 can be controlled by physically separate crystals. For example, the clocks 124/134 can be separately controlled in desktop computers or in wireless applications as noted previously. In other implementations, the loudspeaker and microphone's converters 122/132 may be controlled by the same clock, but at different sample rates.

Thus, the microphone's clock 124 during a conference can be faster or slower than the loudspeaker's clock 134. Although the difference may be small, the discrepancy can interfere with the acoustic echo canceller 200 of the endpoint 10. If the microphone's clock 124 is faster, then the microphone 120 would capture echo of more samples than what the loudspeaker 130 outputs. Later attempts in the signal processing to reduce echo would result in erroneous subtraction of the loudspeaker signal from the microphone signal due to the underlying discrepancy in the sample rates of the clocks 124/134.

Regardless of the particular implementation, the frequencies of the converters' clocks 124/134 may be off by 100 PPM or more. To match the frequencies, measuring the frequency difference by using the audio present on the loudspeaker and microphone channels can be difficult. Accordingly, the acoustic echo canceller 200 for the endpoint 10 uses clock compensation as detailed herein.

The goal of the clock compensation is to match a first sampling frequency of a loudspeaker reference signal to a second sampling frequency of the microphone signal. Once the frequency difference is known within an acceptable threshold (e.g., to within 1 PPM or so), the clock compensation uses conventional resampling algorithms to convert the speaker signal sample rate to match that of the microphone signal sample rate or vice-versa, thus obtaining proper acoustic echo cancellation.

In this way, the clock compensation by the acoustic echo canceller 200 can provide high quality echo cancellation when the microphone and loudspeaker have different clocks, as in a desktop conferencing environment or in a wireless environment. In a wireless environment, for example, an asynchronous link, such as Ethernet, may be used. The disclosed clock compensation can allow the microphone 120 and loudspeaker 130 to use Ethernet to send or receive audio, as opposed to a much more computationally expensive synchronous method of sending precision data that locks all clocks together.

Figure 3:
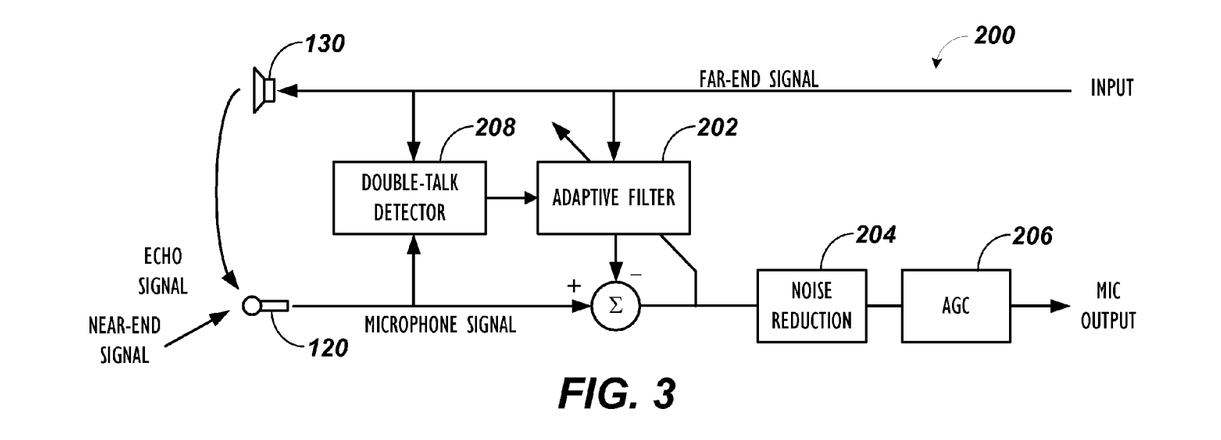
FIG. 3 illustrates an acoustic echo canceller and other processing components for the conferencing endpoint.

Before turning to further details of the clock compensation, discussion first turns to details of the acoustic echo cancellation. FIG. 3 shows features of an acoustic echo canceller 200 and other processing components according to the present disclosure. The canceller 200 uses some of the common techniques to cancel acoustic echo. In general, the canceller 200 receives a far-end signal as input and passes the signal to the loudspeaker 130 for output. Concurrently, the canceller 200 receives an input signal from the microphone 120. This microphone signal can include the near-end audio signals, any echo signal, and whatever background noise may be present. An adaptive filter 202 matches the far-end signal to the microphone signal, and the canceller 200 subtracts the far-end signal from the microphone signal. The resulting signal can then lack the acoustically coupled echo from the loudspeaker 130.

As part of additional processing, the canceller 200 can include a double-talk detector 208 that compares the far-end signal and the microphone signal to determine if the current conference audio represents single-talk (speaker(s) at one (near or far) end) or represents double-talk (speakers at near and far end). In some implementations, the adaptive filter 202 may be modified or not operated when double-talk is determined, or echo cancellation may be stopped altogether during double-talk.

In addition, the signal processing by the canceller 200 can use noise suppression, buffering delay, equalization, automatic gain control, speech compression (to reduce computation requirements), and other suitable processes. For example, the microphone output signal may pass through noise reduction 204, automatic gain control 206, and any other form of audio processing before transmission.

Figure 4:
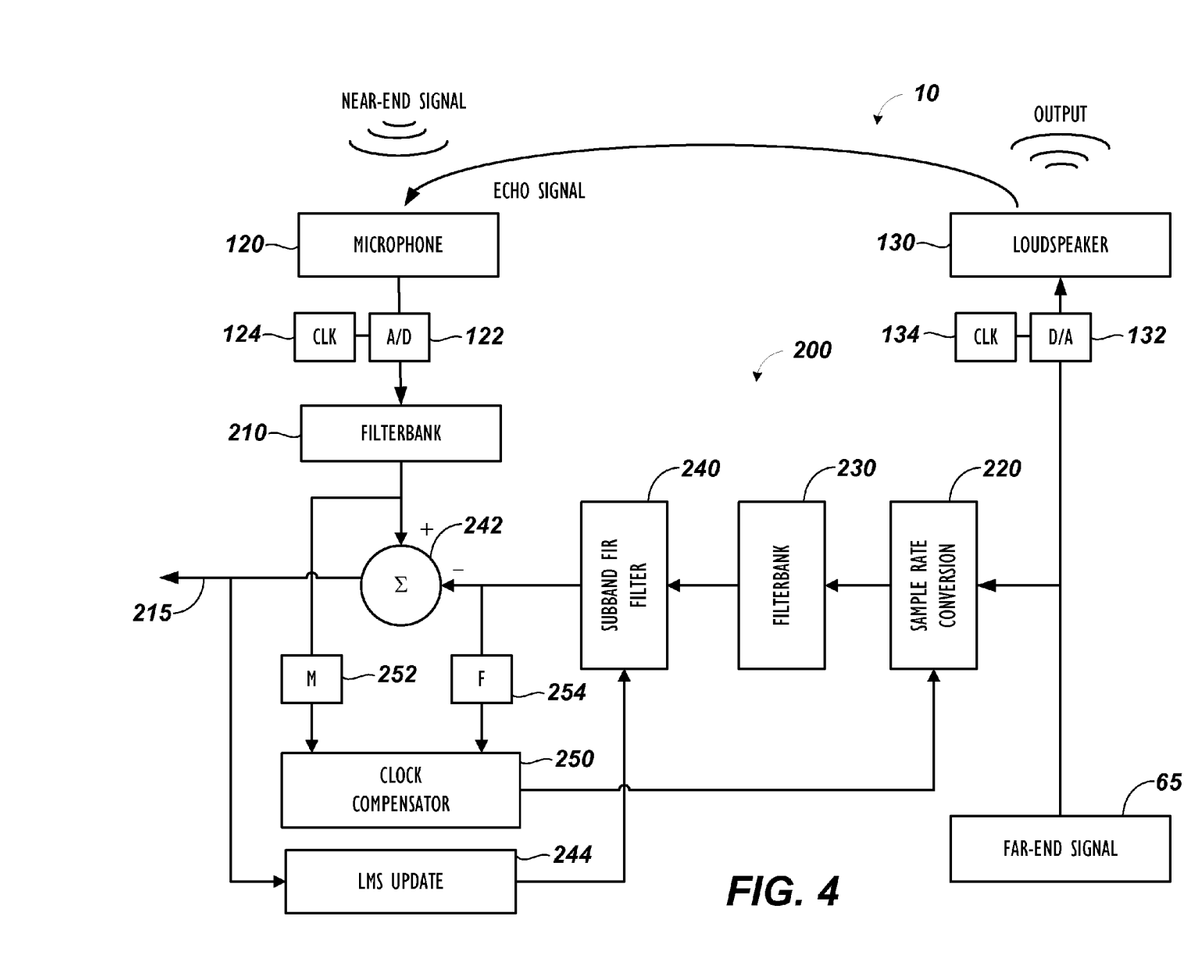
FIG. 4 diagrams a process for acoustic echo cancellation with clock compensation according to the present disclosure.

With an understanding of the acoustic echo canceller 200 and other processing components, discussion now turns to FIG. 4, which shows further details of the acoustic echo canceller 200 having a clock compensator 250 according to the present disclosure. As before, the canceller 200 uses some of the common techniques to cancel acoustic echo. In general, the canceller 200 samples and filters the far-end signal 65 that is passed to the loudspeaker 130 for output. The canceller 200 matches the filtered far-end signal to the near-end signal from the microphone 120. Then, the canceller 200 subtracts the filtered far-end signal from the near-end signal so that the resulting correlated signal 210 lacks acoustically coupled echo from the local loudspeaker 120.

In particular, the far-end signal 65 is received for rendering out to the loudspeaker 130 via the loudspeaker's converter 132 controlled by the loudspeaker clock 134. This far-end signal 65 is also used to estimate the acoustic echo captured by the endpoint 10 in the near-end audio from the microphone 120 so that acoustic echo can be cancelled from the output signal 215 to be sent to the far-end. For its part, the microphone 120 has its own A/D converter 122 and clock 124. Yet, because the microphone and loudspeaker clocks 124/134 are independent, the canceller 200 attempts to compensate for the discrepancies in the clocks 124/134.

To do this, the canceller 200 uses a phase lock loop that estimates the echo, cross-correlates the near and far-end signals, and dynamically adjusts a sample rate conversion factor using feedback. Over the processing loop, this sample rate conversion factor attempts to account for the differences in the clocks 124/134 so that the acoustic echo cancellation can better correlate the far-end signal and the microphone signal to reduce or cancel echo.

Initially, the far-end signal 65, which is to pass to the loudspeaker 130 as output, also passes through a sample rate conversion 220. In this stage, the conversion 220 adjusts the sample rate for the far-end signal based on a factor derived from the perceived clock discrepancy. At first, the conversion factor (microphone clock rate to loudspeaker clock rate) may essentially be 1:1 because the phase lock loop has no feedback. Alternatively, some other predetermined factor may be set automatically or manually depending on the implementation. The initial conversion factor will of course change during operation as feedback from the cross-correlation between the echo estimate and the microphone signal is obtained. As the feedback comes in, the factor for the sample rate conversion 220 is adjusted in the phase lock loop to produce better clock compensation for the echo cancellation process as described below.

From the conversion 220, the signal then passes through an analysis filterbank 230 that filters the signal into desired frequency bins for analysis. This filtering can use standard procedures and practices. For example, the signal can be filtered into 960 frequency bands spanning 0 to 24 kHz, with band centers at 25 Hz apart.

Finally, the signal passes through an adaptive sub-band finite impulse response (FIR) filter 240 that uses filtering techniques known and used in the art. Although the FIR filter 240 is shown, other types of adaptive filters can be used. For example, an infinite impulse response (IIR) filter with appropriate modifications can be used.

In general, the adaptive FIR filter 240 has weights (coefficients) that are iteratively adjusted to minimize the resultant energy when the near and far-end signals are subtracted from one another at stage 242 during later processing. To do this, the adaptive FIR filter 240 seeks to mimic characteristics of the near-end environment, such as the room and surroundings, and how those characteristics affect the subject waveforms of the far-end signal. When then applied to the far-end signal being processed, the adaptive FIR filter 240 can filter the far-end signal so that it resembles the microphone's signal. In this way, less energy variance results once the near-end and filtered far-end signals are subtracted.

Concurrent with this processing, the microphone 120 captures near-end audio signals from the conferencing environment. Again, these near-end signals can include near-end audio, echo, background noise, and the like. The near-end signal passes through an analysis filterbank 210 that filters the signal into desired frequency bins for analysis the same as the other filterbank 230. As expected, this near-end signal may or may not have acoustic echo present due to the acoustic coupling from the loudspeaker 130 to the microphone 120. Additionally, the microphone's A/D converter 122 runs on its own clock 124, which can be different from the loudspeaker's clock 134. As highlighted previously, the different clocks 124/134 produce different clock rates that can be rather small but diverge overtime.

From the near-end filterbank 210 and the FIR filter 240, a summer 242 produces a signal 215 where the acoustic signal from the loudspeaker is greatly attenuated (typically by 20 dB) by subtracting the filtered far-end signal from the filtered near-end signal. Thus, in this signal 215, the far-end signal picked up as acoustic echo in the near-end signal is subtracted out of the near-end signal. In this signal 215, the acoustic echo canceller 200 cancels acoustic echo in the microphone signal that will be output to the far-end so that the far-end will not receive its own audio back as echo. Of course, this acoustic echo cancellation is accomplished to the extent possible based on the current factor in the sample rate conversion 220.

As part of the adaptive filtering, a least mean square (LMS) update 270 use the signal 215 to adjust the sub-band FIR filter 240. This LMS update 244 can use standard update information for an FIR filter known and used in the art. For example, the signal 215 passes through an adaptive least mean square (LMS) algorithm that iteratively adjusts coefficients of the FIR filter 240. In this way, the LMS update 244 fed back to the adaptive filter 240 helps to improve the wave matching performed by the filter 240.

When performing subtraction of the acoustic loudspeaker signal in acoustic echo cancellation, however, the drift from the different clocks 124/134 can be equivalent to a situation of the microphone 120 and the loudspeaker 130 moving closer or farther from one another during the conference. The net result is that acoustic echo cancellation suffers (e.g., the attenuation of the acoustic loudspeaker signal is diminished) from the differences in clock rates.

At this point in the processing, the clock compensator 250 uses processed signals to deal with clock discrepancies. In particular, the filtered far-end signal 254 containing an estimation of the echo is fed to the clock compensator 250. In addition, the microphone's filtered signal 252 passes to the clock compensator 250. In turn, the clock compensator 250 provides feedback to the sample rate conversion 220 so the particular conversion factor can be adjusted to better match the discrepancy between the microphone and loudspeaker clocks 124/134.

Figure 5:
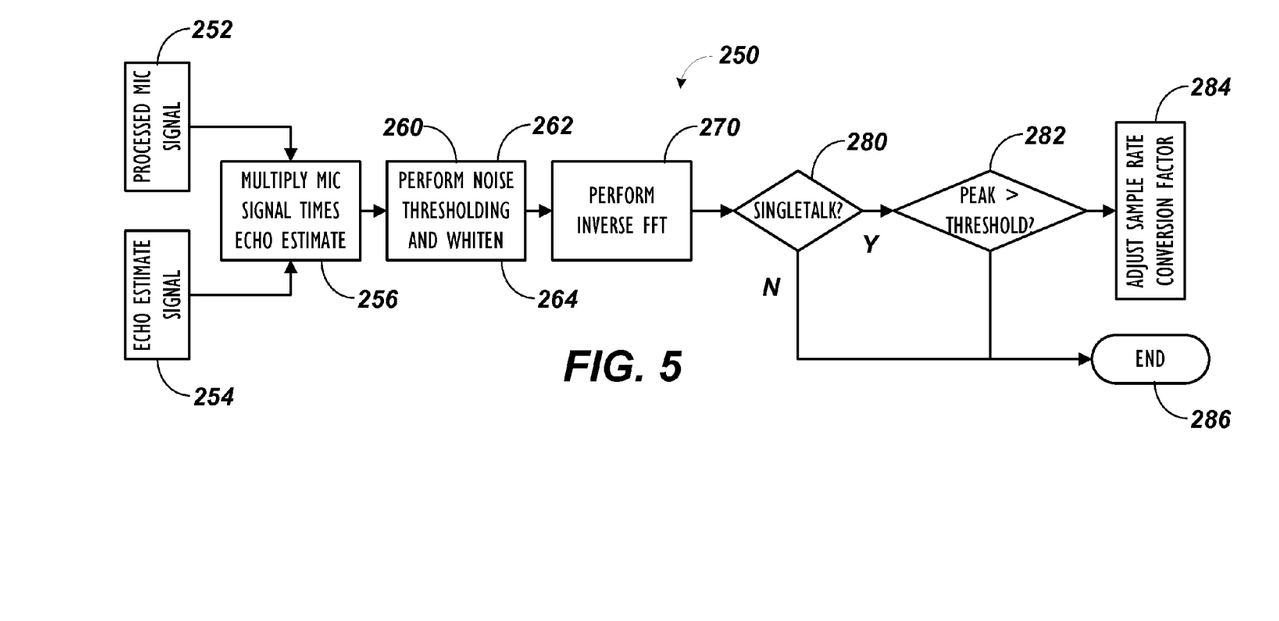
FIG. 5 diagrams a process for the clock compensator in more detail.

FIG. 5 shows a process for the clock compensator 250 to handle the processed microphone and loudspeaker signals and adjust the sample rate conversion 220 of FIG. 3. The clock compensator 250 cross-correlates the microphone's filtered near-end signal 252 and the estimated loudspeaker echo 254 in the frequency domain via classical techniques. First, the microphone signal 252 is multiplied by the conjugate of the echo estimate signal 254 (Block 256), deriving an array of complex values for the frequency bins in the frequency domain which will undergo further processing.

Next, the compensator 250 performs two filtering operations (Block 260). First, the compensator 250 performs noise thresholding 262. In this process, the endpoint's audio module (30; FIG. 1) or other component performs noise estimation using standard techniques to determine the noise levels for particular frequency bins of the environment. Based on the noise estimation information, the noise thresholding 262 determines which of the frequency bins of the subject signal have energy levels attributed to background noise and not audio of interest. For those frequency bins attributable to background noise, the noise thresholding 262 zeros out the energy levels so that they will not have effect in later processing.

Next, the compensator 250 whitens the subject signal with a whitening process 264. In this process 264, the complex value of each of the subject signal's frequency bins is normalized to one in magnitude. The phase of the complex value is unchanged. This whitening helps emphasize any resulting cross-corelation peak due to time lags produced in later processing.

Continuing with the processing, the compensator 250 then converts the subject signal back to the time domain using an inverse Fast Fourier Transform (FFT) process 270. This conversion to the time domain produces a cross-correlation peak indicative of how the microphone signal and echo estimate signal correlate to one another in time.

At this point, the compensator 250 checks whether the current signal represents single-talk or double-talk. If the current signal represents a double-talk period when signals from both near-end and far-end participatents coexist, then the process may end because processing may be unnecessary or problematic in this situation. As noted previously, the acoustic echo canceller 200 can use a double-talk detector (208; FIG. 3) for this purpose.

If the current period is single-talk (i.e., only the far-end participant is talking, so that sound is only coming out the loudspeaker), the clock compensator 250 determines whether the cross-correlation peak exceeds a threshold. The value of this threshold can depend on the implementation and the desired convergence of the clock compensator 250, processing capabilites, etc. If the cross-correlation peak does not exceed the threshold, then the clock compensator 250 ends processing at 286. In this situation, the cross-correlation peak fails to indicate enough information about the discrepancy between the clocks to warrant adjusting the conversion factor of the sample rate conversion (220; FIG. 4).

If the cross-correlation peak does exceed the threshold, then the clock compensator 250 adjusts the conversion factor of the sample rate conversion (Block 284). For this adjustment, the time index or position (positive or negative) of the cross-correlation peak relative to ideal correlation (zero) is used to increase or decrease the factor of the one of the clock frequencies used in the sample rate conversion (220; FIG. 4). The amount of adjustment of the conversion factor to be performed for a given position of the correlation peak depends on the implementation and the desired convergence of the clock compensator 250, processing capabilites, etc.

In one example, the microphone's clock (124; FIG. 4) may have a frequency that is N percent lower than the frequency of the loudspeaker's clock 134. In this case, the samples of echo signals picked up by the microphone 120 would appear to be N percent higher using than the microphone's clock as a reference. The effect is similar to the microphone 120 continually being physically moved closer to the loudspeaker 130. The converse occurs if the microphone's clock frequency is N percent lower than the loudspeaker's clock frequency.

If the cross-correlation peak occurs at a positive time index or value, the implication is that the loudspeaker's clock frequency is high with respect to the microphone's clock frequency. Thus, the conversion factor relating the loudspeaker's clock frequency is lowered by an amount relative to the microphone's clock frequency. The converse action occurs if the cross-correlation peak occurs at a negative time index or value. If the cross-correlation peak occurs at the time index corresponding to zero, the implication is that the loudspeaker's and microphone's clocks 124/134 are matched within at least some accepted error.

In essence, the "phase-locked loop" of the acoustic echo canceller 200 with clock compensator 250 adjusts processing so that it appears the loudspeaker's clock 134 is "locked" or "synced" to the microphone's clock 124 for echo cancellation. In general, the acoustic echo canceller 200 with clock compensator 250 can match loudspeaker and microphone clocks 124/134 to about +/−0.02 PPM after 30 seconds of speech. This eliminates the need for the microphone and speaker clocks 124/134 to be independently synchronized for good echo cancellation to occur at the conferencing endpoint 10.

The techniques of the present disclosure can be implemented in digital electronic circuitry, computer hardware, firmware, software, or any combinations of these. Apparatus for practicing the disclosed techniques can be implemented in a program storage device, computer-readable media, or other tangibly embodied machine-readable storage device for execution by a programmable control device. The disclosed techniques can be performed by a programmable processor executing program instructions to perform functions of the disclosed techniques by operating on input data and generating output. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An acoustic echo cancellation method for conference audio, comprising:
    obtaining far-end audio for output to a loudspeaker having a first clock;
    obtaining near-end audio with a microphone having a second clock;
    performing acoustic echo cancellation with the far-end and near-end audio;
    cross-correlating an acoustic echo estimate of the far-end signal with the near-end signal; and
    adjusting the far-end audio used for the acoustic echo cancellation by a factor relating first and second conversion rates of the first and second clocks based on the cross-correlation.

2. The method of claim 1, wherein obtaining far-end audio comprises filtering the far-end audio into a plurality of bands for analysis, and wherein obtaining near-end audio comprises filtering the near-end audio into the bands for analysis.

3. The method of claim 1, wherein performing acoustic echo cancellation with the far-end and near-end audio comprises adaptively filtering the far-end audio relative to the near-end audio.

4. The method of claim 3, wherein the adaptive filtering comprises an adaptive finite impulse response filter filtering the far-end signal.

5. The method of claim 4, wherein the adaptive finite impulse response filter comprises a least mean square update adjusting coefficients of the adaptive finite impulse response filter based on cross-correlated audio having the adaptively filtered far-end audio subtracted from the near-end audio.

6. The method of claim 3, wherein cross-correlating an acoustic echo estimate of the far-end signal with the near-end signal comprises cross-correlating the adaptively filtered audio and the near-end audio to one another.

7. The method of claim 1, wherein adjusting the far-end audio used for the acoustic echo cancellation by a factor relating first and second conversion rates of the first and second clocks based on the cross-correlation comprises adjusting the factor by an amount based on a time index of a peak of the cross-correlation relative to a matching correlation.

8. The method of claim 1, wherein adjusting the far-end audio used for the acoustic echo cancellation by a factor relating first and second conversion rates of the first and second clocks based on the cross-correlation comprises determining that a peak of the cross-correlation exceeds a threshold.

9. The method of claim 1, wherein adjusting the far-end audio used for the acoustic echo cancellation by a factor relating first and second conversion rates of the first and second clocks based on the cross-correlation comprises determining that the near-end and far-end audio are indicative of single-talk.

10. The method of claim 1, wherein cross-correlating an acoustic echo estimate of the far-end signal with the near-end signal comprises performing noise thresholding on a resultant comparison of the signals.

11. The method of claim 1, wherein cross-correlating an acoustic echo estimate of the far-end signal with the near-end signal comprises normalizing magnitude of a resultant comparison of the signals.

12. A non-transitory machine-readable medium storing program instructions for causing a programmable control device to perform an acoustic echo cancellation method for conference audio, the method comprising:
    obtaining far-end audio for output to a loudspeaker having a first clock;
    obtaining near-end audio with a microphone having a second clock;
    performing acoustic echo cancellation with the far-end and near-end audio;
    cross-correlating an acoustic echo estimate of the far-end signal with the near-end signal; and
    adjusting the far-end audio used for the acoustic echo cancellation by a factor relating first and second conversion rates of the first and second clocks based on the cross-correlation.

13. An acoustic echo cancellation method for conference audio, comprising:
    obtaining far-end audio for output to a loudspeaker having a first clock with a first conversion sample rate;
    obtaining near-end audio with a microphone having a second clock with a second conversion sample rate;

adaptively filtering the far-end audio relative to the near-end audio;

outputting output audio for transmission to the far-end, the output audio having the adaptively filtered audio subtracted from the near-end audio;

cross-correlating the adaptively filtered audio and the near-end audio; and adjusting the obtained far-end audio by a factor relating the first and second conversion sample rates based on the cross-correlation.

14. A non-transitory machine-readable medium storing program instructions for causing a programmable control device to perform an acoustic echo cancellation method for conference audio, the method comprising:

obtaining far-end audio for output to a loudspeaker having a first clock with a first conversion sample rate;

obtaining near-end audio with a microphone having a second clock with a second conversion sample rate;

adaptively filtering the far-end audio relative to the near-end audio;

outputting output audio for transmission to the far-end, the output audio having the adaptively filtered audio subtracted from the near-end audio;

cross-correlating the adaptively filtered audio and the near-end audio; and adjusting the obtained far-end audio by a factor relating the first and second conversion sample rates based on the cross-correlation.

15. A conferencing endpoint, comprising:

a microphone capturing near-end audio based on a first clock;

a loudspeaker outputting far-end audio based on a second clock;

a network interface receiving the far-end audio and outputting output audio; and a processing unit operatively coupled to the microphone, the loudspeaker, and the network interface and configured to:

perform acoustic echo cancellation between the near-end and far-end audio;

output the acoustic echo cancelled audio as the output audio with the network interface;

cross-correlate an acoustic echo estimate of the far-end signal with the near-end signal; and adjust the far-end audio used for the acoustic echo cancellation by a factor relating first and second conversion sample rates of the first and second clocks based on the cross-correlation.

16. The endpoint of claim 15, wherein the endpoint comprises a computer.

17. The endpoint of claim 15, wherein to obtain far-end audio, the processing unit is configured to filter the far-end audio into a plurality of bands for analysis, and wherein to obtain near-end audio, the processing unit is configured to filter the near-end audio into the bands for analysis.

18. The endpoint of claim 15, wherein to perform acoustic echo cancellation with the far-end and near-end audio, the processing unit is configured to adaptively filter the far-end audio relative to the near-end audio.

19. The endpoint of claim 18, wherein to adaptively filter the far-end audio relative to the near-end audio, the processing unit is configured to filter the far-end signal using an adaptive finite impulse response filter.

20. The endpoint of claim 19, wherein the adaptive finite impulse response filter comprises a least mean square update adjusting coefficients of the adaptive finite impulse response filter based on cross-correlated audio having the adaptively filtered far-end audio subtracted from the near-end audio.

21. The endpoint of claim 18, wherein to cross-correlate an acoustic echo estimate of the far-end signal with the near-end signal, the processing unit is configured to cross-correlate the adaptively filtered audio and the near-end audio to one another.

22. The endpoint of claim 15, wherein to adjust the far-end audio used for the acoustic echo cancellation by a factor relating first and second conversion rates of the first and second clocks based on the cross-correlation, the processing unit is configured to:

adjust the factor by an amount based on a time index of a peak of the cross-correlation relative to a matching correlation;

determine that a peak of the cross-correlation exceeds a threshold; or determine that the near-end and far-end audio are indicative of single-talk.

23. The endpoint of claim 15, wherein to cross-correlate an acoustic echo estimate of the far-end signal with the near-end signal, the processing unit is configured to:

perform noise thresholding on a resultant comparison of the signals; or normalize magnitude of a resultant comparison of the signals.

24. The medium of claim 12, wherein obtaining far-end audio comprises filtering the far-end audio into a plurality of bands for analysis, and wherein obtaining near-end audio comprises filtering the near-end audio into the bands for analysis.

25. The medium of claim 12, wherein performing acoustic echo cancellation with the far-end and near-end audio comprises adaptively filtering the far-end audio relative to the near-end audio.

26. The medium of claim 25, wherein the adaptive filtering comprises an adaptive finite impulse response filter filtering the far-end signal.

27. The medium of claim 26, wherein the adaptive filter comprises a least mean square update adjusting coefficients of the adaptive finite impulse response filter based on cross-correlated audio having the adaptively filtered far-end audio subtracted from the near-end audio.

28. The medium of claim 25, wherein cross-correlating an acoustic echo estimate of the far-end signal with the near-end signal comprises cross-correlating the adaptively filtered audio and the near-end audio to one another.

29. The medium of claim 12, wherein adjusting the far-end audio used for the acoustic echo cancellation by a factor relating first and second conversion rates of the first and second clocks based on the cross-correlation comprises:

adjusting the factor by an amount based on a time index of a peak of the cross- correlation relative to a matching correlation;

determining that a peak of the cross-correlation exceeds a threshold; or determining that the near-end and far-end audio are indicative of single-talk.

30. The medium of claim 12, wherein cross-correlating an acoustic echo estimate of the far-end signal with the near-end signal comprises:

performing noise thresholding on a resultant comparison of the signals; or normalizing magnitude of a resultant comparison of the signals.

31. The method of claim 13, wherein adaptively filtering the far-end audio relative to the near-end audio comprises filtering the far-end signal using an adaptive finite impulse response filter.

32. The method of claim 31, wherein the adaptive finite impulse response filter comprises a least mean square update adjusting coefficients of the adaptive finite impulse response filter based on cross-correlated audio having the adaptively filtered far-end audio subtracted from the near-end audio.

33. The method of claim 13, wherein adjusting the far-end audio used for the acoustic echo cancellation by a factor relating first and second conversion rates of the first and second clocks based on the cross-correlation comprises:
   adjusting the factor by an amount based on a time index of a peak of the cross-correlation relative to a matching correlation;
   determining that a peak of the cross-correlation exceeds a threshold; or
   determining that the near-end and far-end audio are indicative of single-talk.

34. The method of claim 13, wherein cross-correlating the adaptively filtered audio and the near-end audio comprises:
   performing noise thresholding on a resultant comparison of the signals; or
   normalizing magnitude of a resultant comparison of the signals.

35. The medium of claim 14, wherein obtaining far-end audio comprises filtering the far-end audio into a plurality of bands for analysis, and wherein obtaining near-end audio comprises filtering the near-end audio into the bands for analysis.

36. The medium of claim 14, wherein adaptively filtering the far-end audio relative to the near-end audio comprises filtering the far-end signal using an adaptive finite impulse response filter.

37. The medium of claim 36, wherein the adaptive finite impulse response filter comprises a least mean square update adjusting coefficients of the adaptive finite impulse response filter based on cross-correlated audio having the adaptively filtered far-end audio subtracted from the near-end audio.

38. The medium of claim 14, wherein adjusting the far-end audio used for the acoustic echo cancellation by a factor relating first and second conversion rates of the first and second clocks based on the cross-correlation comprises:
   adjusting the factor by an amount based on a time index of a peak of the cross-correlation relative to a matching correlation;
   determining that a peak of the cross-correlation exceeds a threshold; or
   determining that the near-end and far-end audio are indicative of single-talk.

39. The medium of claim 14, wherein cross-correlating the adaptively filtered audio and the near-end audio comprises:
   performing noise thresholding on a resultant comparison of the signals; or
   normalizing magnitude of a resultant comparison of the signals.

\* \* \* \* \*